R. S. GEHR.
DOOR CONTROLLING APPARATUS.
APPLICATION FILED MAR. 30, 1916. RENEWED MAY 13, 1921.

1,408,186.

Patented Feb. 28, 1922.

Inventor
Ray Stewart Gehr

R. S. GEHR.
DOOR CONTROLLING APPARATUS.
APPLICATION FILED MAR. 30, 1916. RENEWED MAY 13, 1921.

1,408,186.

Patented Feb. 28, 1922.

Inventor
Ray Stewart Gehr

UNITED STATES PATENT OFFICE.

RAY STEWART GEHR, OF CLEVELAND, OHIO.

DOOR-CONTROLLING APPARATUS.

1,408,186.    Specification of Letters Patent.    Patented Feb. 28, 1922.

Application filed March 30, 1916, Serial No. 87,819. Renewed May 13, 1921. Serial No. 469,327.

*To all whom it may concern:*

Be it known that I, RAY STEWART GEHR, a citizen of the United States, residing at Cleveland, in the county of Cuyahoga and State of Ohio, have invented certain new and useful Improvements in Door-Controlling Apparatus, of which the following is a specification, reference being had therein to the accompanying drawing.

The invention relates to apparatus for controlling the movements, and particularly the closing movements, of doors. One of the principal objects of the invention is the provision of a self-contained apparatus constructed and arranged to effect the closure of a door and also to automatically yieldingly hold the door open, against the force of the closing means, when the door is released in any open position; so that the door, when opened, is always automatically held open but, when a moderate push or pull is applied to it, the yielding holding or stop devices are overcome and the door is closed by the closing devices.

A further object of the invention is the provision of an improved mechanism controlled by the movement of the door and acting to automatically yieldingly resist the closing movement of the door from any open position.

Other objects of the invention more or less incidental or ancillary to those above mentioned will appear in the following description in which, for the purposes of illustration and explanation, I set forth, in connection with the accompanying drawings, several preferred forms of construction embodying my improvements.

In the accompanying drawings—

Fig. 26 is a fragmentary vertical section showing the positions occupied by the co-acting stop devices when the swinging lever arm has moved, in the closing movement of the door, to the position indicated by the radial line $a$ in Fig. 24.

Referring first to the form of apparatus shown in Figs. 1 to 12, inclusive, 1 designates the main supporting member of the apparatus designed to be rigidly secured to a door or its frame, but preferably to the door itself, and which, in the present type of construction, is in the form of a casing enclosing door check and closing mechanisms. The lower part $1^a$ of the casing encloses the check mechanism, and the upper part $1^b$ contains the closing mechanism. I do not illustrate the check mechanism as it may be of any suitable known construction, preferably of the double acting type, for example such as that shown in United States Patent No. 962,143 or United States Patent No. 999,522.

The closing mechanism comprises a spring 2 preferably of the double acting sort. I do not illustrate the spring and its co-acting parts in detail as any suitable known form of construction may be used, such, for example, as those illustrated in United States Patents 962,144 and 999,522.

The casing 1 is provided with a removable cap $1^c$ which is normally rigidly secured to the body of the casing as by a screw 3.

Figure 3:
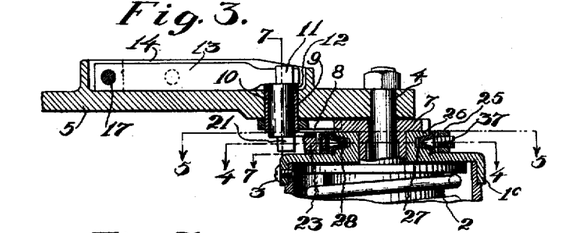
Fig. 3 is a fragmentary vertical section on the broken line 3—3 of Fig. 2.

Referring to Fig. 3, 4 designates the shaft or spindle which, as is well understood, is operatively connected at its lower end with the check mechanism. A lever arm 5 is rigidly secured at its inner end to the upper end of the spindle 4 and has its outer end connected by means of an adjustable link 6 to the door casing. 7 is the ratchet wheel which is formed as usual with a depending sleeve operatively connected with the closing spring 2. The ratchet wheel 7 turns freely on the spindle 4 but is adjustably connected to the lever arm 5 in the usual manner by the double armed dog 8.

It will be observed that the parts of the apparatus so far described constitute in effect a door check and closer of the sort now in common use. Such an apparatus serves in operation simply to effect the closure of the door when opened. It has been proposed heretofore to provide such an apparatus with a yieldable stop device adapted to hold the door yieldingly in one or more open positions, and for certain uses devices of this latter sort have proved advantageous. My present invention has in view, however, uses and services the requirements of which are not met by the earlier devices referred to. In the case of interior doors, and especially in the case of doors between communicating rooms, the conditions call for a door controlling apparatus which is capable of quietly closing the door and which, at the same time, is capable of retaining the door in any open position, and it is especially desirable that the conscious attention of persons passing through the door should not be required in order to secure the proper operation of the apparatus.

To meet the requirements last referred to I provide, in connection with the parts previously described a holding mechanism of peculiar construction and operation. Briefly described, this holding mechanism comprises a catch mounted on the swinging arm 5 and a stop shoulder mounted on the cap $1^c$ of the casing 1, and adapted to cooperate with the catch, either the catch or the stop shoulder, preferably the former, being yieldingly mounted, and means being provided to automatically adjust the stop shoulder angularly as the lever arm 5 swings so that said shoulder is always in position to be engaged by the catch at the beginning of the closing movement of the door regardless of the extent to which the door is open.

In the specific construction shown the catch comprises a spindle 9 which is rotatably mounted in a sleeve 10 suitably secured, as by a driven fit, in the lever arm 5. The lower end of the sleeve 10 serves as a pivotal support for the ratchet dog 8. The spindle 9 has at its upper end a plate-like cam extension 11.

The spindle is also fitted at its upper end with a collar 12 which rests upon the upper end of the sleeve 10 and sustains the spindle. In the construction shown this collar is in the form of a separate part applied to the spindle with a driven fit. The cam 11 cooperates with a flat spring 13. The lever arm 5 is formed with an integral upstanding wall 14 which serves to enclose the spring 13 and the cam extension 11 of the spindle. Near the outer part of the wall 14 it is formed on each side with threaded apertures 15 and 16 each of which is adapted to receive a screw 17 which serves to clamp the outer end of the spring 13 rigidly to the lever arm 5. At intermediate points on each side, the endless wall 14 is formed with threaded apertures 18 and 19 each of which is adapted to receive an adjustable screw 20 which acts as an adjustable abutment for the spring 13 at a point intermediate its ends and thus serves to vary the effective tension of the spring with respect to the cam 11. It will be noted upon reference to Figs. 3 and 6 that the active part of the cam plate 11 has its outer side near the axis of the spindle 9 while its inner side is at a relatively greater distance from said axis. Thus, referring to Fig. 6, if the spindle 9 is oscillated in a counter-clockwise direction, the long side of the cam plate 11 is forced against the spring 13 causing it to be flexed widely, while an oscillation of the spindle in the opposite direction causes the short side of the cam to be forced against the spring 13 so that the latter is flexed only a slight amount.

At its lower end the spindle 9 is formed with a radially disposed plate-like contact arm 21. The contact plate 21 and the cam plate 11 are disposed in the same vertical plane, and both are normally held by the spring 13 parallel to the axis of the arm 5.

Figure 10:
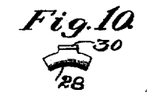
Figs. 10 and 11 are plan and inside elevation, respectively, of the friction shoes.
Figure 11:
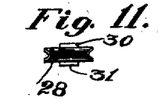

The plate 21 of the catch device is arranged to cooperate with a stop shoulder 23 which is carried by the cap of the casing 1. This shoulder 23 is in the form of a lever mounted on a vertical pivot pin 24 which is secured in an annular carrier 25, the latter being formed with a segmental opening 25ª to accommodate the shoulder or lever 23 as well as other parts which will presently be referred to. This carrier fits over an upstanding flange 26 formed on the cap 1ᶜ. The opening of the carrier is preferably made slightly elliptical with the long axis of the ellipse passing through the pivot pin 24 so that the carrier will be permitted a certain amount of movement in the direction of said long axis. The flange 26 is formed with a circumferential V-groove 27 designed to receive a pair of diametrically opposite friction shoes 28 and 29. One of these friction shoes, which are alike, is shown in Figs. 10 and 11. Each shoe is formed with upwardly and downwardly turned lugs 30, 31 and the carrier at diametrically opposite points is formed with notches 32 and 33 to receive said lugs. Thus, the friction shoes are connected with the carrier in such way that they, as well as the stop shoulder 23, are moved by it when it turns on the flange 26.

Figures 4, 7, 8:
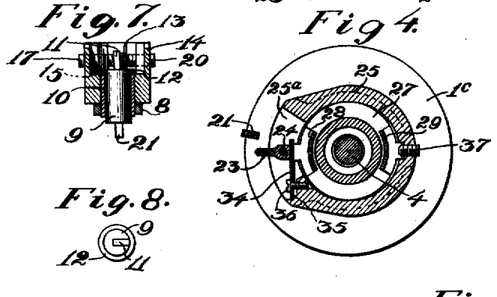
Fig. 4 is a horizontal section on the line 4—4 of Fig. 3.
Fig. 7 is a vertical section on the line 7—7 of Fig. 3.
Figs. 8 and 9 are top and bottom views, respectively, of the stop spindle.

A flat spring 34 has one of its ends interposed between the inner squared end of the lever 23 and the upwardly and downwardly extending lugs 30 and 31 of the friction shoe 28 (see Fig. 4). The other end of the spring bears against a shoulder 35 formed on the carrier 25 and the screw 36 serves to secure the spring to the carrier and to apply an inward tension to the spring as will readily be understood. The friction shoe 29 is engaged by an adjusting screw 37 mounted in the carrier.

Figure 5:
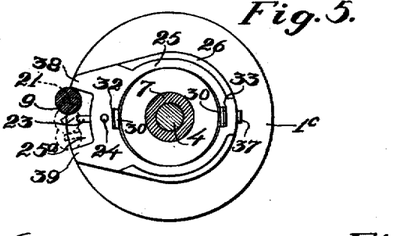
Fig. 5 is a horizontal section on the line 5—5 of Fig. 3.
Figure 6:
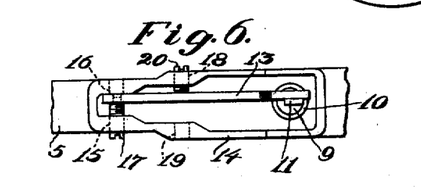
Fig. 6 is a fragmentary plan view showing the stop spring and associated parts.
Figure 9:
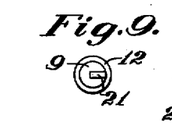

Referring to Fig. 5 it will be noted that the wall of the carrier 25, which overlies the opening 25ª, is formed with a pair of radially extending lugs 38 and 39 which are spaced apart so as to embrace the lower end of the catch spindle 9, the distance between the lugs 38 and 39 being sufficient to permit a certain relative movement of the spindle 9 and the arm which carries it.

In assembling the carrier 25 and associated parts, the friction shoes are first placed in position in the groove 27, the carrier is then passed downward over the flange 26 so as to position the lugs 30 and 31 of the friction shoes in the notches 32 and 33 of the carrier, the screw 37 having first been adjusted outward to facilitate this procedure. Next the screw 37 is adjusted inward until all play is taken up between the parts lying in the diameter through the pivot pin 24 on one side and the screw 37 on the other. This leaves the carrier and its parts fitting somewhat nicely the upstanding flange 26 of the casing cap, but free to turn. Now, however, the screw 36 is tightened slightly thus applying a little tension to the flat spring 34 which serves to tighten the friction shoes 28 and 29 and cause a slight braking action resisting the turning of the carrier 25.

Figure 1:
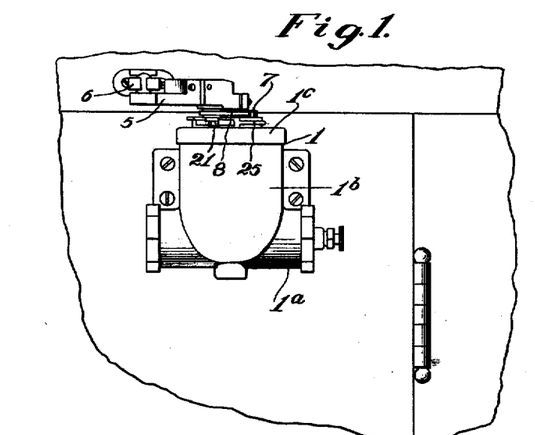
Figure 1 is a front elevation of a door controlling apparatus embodying some of my improvements, the apparatus being shown operatively connected to a door and its frame.
Figure 2:
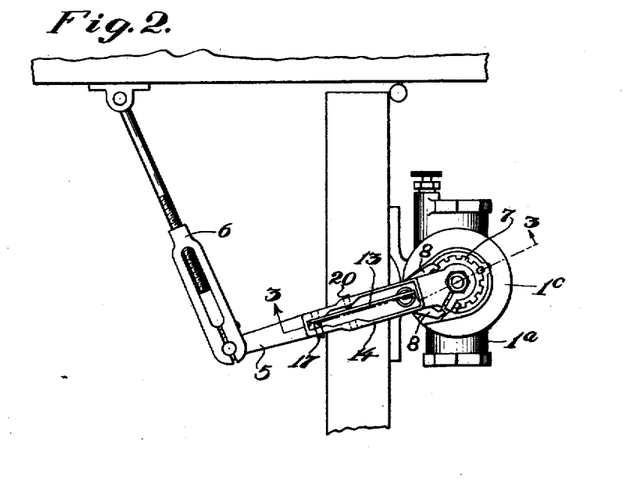
Fig. 2 is a plan view of the apparatus shown in Fig. 1 with the parts in the positions occupied when the door is swung open.

In the operation of the mechanism described above, the casing 1 having been screwed to the door and the link 6 suitably secured to the door frame, as shown in Figs. 1 and 2, the opening movement of the door causes the lever arm 5 to swing in a clockwise direction in relation to the casing 1, such movement being made in opposition to the tension of the closing spring 2 as will be understood. Assuming that the door is opened to the position indicated in Fig. 2 and is then released, the door starts to close under the action of the closing spring 2. At the beginning of the closing movement which is thus started, the holding devices are in the relative positions indicated in Figs. 3, 4 and 5. That is to say, the catch spindle 9 is in engagement with the lug 38 of the carrier 25 and when the closing movement begins the spindle starts to move away from said lug, the carrier 25 remaining stationary under the slight braking action of the friction shoes. After a slight angular movement of the arm 5, however, the contact arm 21 of the catch engages the stop shoulder 23 and under the tension of the closing spring 2 the spindle 9 is turned as indicated by the upper dotted line position in Fig. 5. This turning movement of the spindle forces the inner side of the cam 11 against the spring 13, flexing the latter until its resistance is equal to the transmitted force of the closing spring. And thereupon the door is brought to rest. In this last described operation of the shoulder 23 it effectively resists the pressure of the catch because the shoulder, acting as a lever, transmits said pressure to the friction shoes 28 and 29 thereby effectively locking the carrier 25 against turning. If it is desired to have the door remain in its open position, it is simply released in such open position, as described above, whereupon the catch devices act as indicated to hold the door against the closing spring, but if it is desired to close the door, it is only necessary to apply to the door a moderate pull or push sufficient to overcome the tension of the spring 13 and permit the contact plate 21 of the catch to move past the shoulder 23. This releases the pressure on the friction shoes 28, 29 so that when the spindle 9 engages the lug 39 of the carrier, the latter is free to turn with the lever arm 5 in the closing movement of the door. Strictly speaking, the carrier is not wholly free to turn, being subject to the slight frictional resistance caused by the spring 34 which, it will be understood, is provided to insure the effective setting of the friction shoes when the shoulder 23 is engaged by the catch.

When the door is closed, the catch spindle 9 lies against the carrier lug 39 as indicated by the lower dotted line position of the spindle in Fig. 5. When the door begins its opening movement, the spindle moves away from the lug 39 and the contact plate 21 engages the shoulder 23 thus tending to turn the spindle 9 in a clockwise direction. This throws the outer short side of the cam 11 against the spring 13 so that the latter is flexed only slightly by the turning of the spindle and consequently the latter passes the stop shoulder without resulting in the application of any considerable resistance to the opening of the door. The only reason for bringing the spring 13 into action at all in the opening movement is to insure the return of the spindle to its normal position. As the catch escapes from the shoulder, in the opening of the door, it moves into engagement with the lug 38 of the carrier so that the latter is turned with the lever arm 5 as the door continues to open, the catch spindle 9 being left in engagement with the lug 38 at the end of the opening movement, as has been previously indicated.

It will be seen, then, that the stop shoulder is operatively mounted upon a rotatable carrier having a lost motion connection with the spindle 9 of the catch, the operation being such that the yielding catch is thrown into action during the first part of the lost motion permitted between the catch and the shoulder carrier, and the catch being released during the remainder of the lost motion. And by reason of this lost motion connection of the parts, the stop shoulder is carried with the swinging lever 5 as the door opens or closes so that the shoulder is always in position to be engaged by the catch when the movement of the door is reversed. In this connection it may be observed that the amount of lost motion between the spindle 9, on the one hand, and the carrier lugs 38 and 39, on the other hand, necessary to insure engagement and release of the holding devices, will depend upon (a) the forms of the coacting parts 21 and 23 and (b) the accuracy with which the parts of the apparatus are made. As shown in the drawings, more lost motion is provided than is requisite if the parts are accurately constructed.

The effective resistance of the holding spring 13 can be varied by adjustment of the screw 20 as will readily be understood. The relation of the parts is preferably such that the spring 13 is not normally in engagement with the screw 20 but is brought into engagement with it by the wide flexing of the spring caused by the long inner side of the cam 11 while the shorter outer side of said cam does not flex the spring 13 sufficiently to bring it into engagement with said screw.

It will be understood, of course, that when the resistance of the holding devices has been overcome by the slight manual movement of the door from its open position, nothing further is needed to insure the closing of the door, the closing and checking mechanisms operating for this purpose in their usual manner.

Door checks and closers are commonly made so as to operate on either left hand or right hand doors, and the yielding holding mechanism above described is adapted for use on either left or right hand doors without any structural modification. In Figs. 1 to 11 the apparatus is shown as applied to a door opening to the right; if it is desired to apply the apparatus to a door opening to the left, it is only necessary to remove the screw 17 from the hole 15, move the spring to the other side of the cam plate 11 and secure it in position by inserting the screw 17 in the opposite hole 16. Similarly the screw 20 is removed from the hole 18 and suitably adjusted in the opposite hole 19. The result of this change is to apply the major tension of the spring 13 when the stop spindle 9 moves in a clockwise direction instead of in a counter-clockwise direction.

Figure 12:
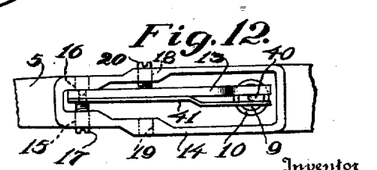
Fig. 12 is a fragmentary plan view showing a modified form of stop spring construction.

In Fig. 12 I have shown a modification of the holding spring construction. The modification involves the provision of a cam plate 40 for the catch spindle which has its rear side shortened so that it has no effect on the spring 13; and in addition to the latter spring a thin and relatively weak spring 41 is provided being clamped in operative position by the screw 17, as indicated, so that the spring 13 engages the cam plate 40 on one side and the spring 41 on the other. With this arrangement the heavy, stiff spring 13 is thrown into operation when the door starts to close, while the light, weak spring 41 comes into operation when the door starts its opening movement. As in the case of the construction shown in Fig. 6, this modified form of construction shown in Fig. 12 is adapted to either right or left hand doors, the change from one to the other being made by interchanging the springs 13 and 41 and transferring the screws 17 and 20, as will readily be understood.

When it is desired to use the mechanism as a simple door check and closer, the holding devices can be thrown out of operation by simply turning the catch spindle 9 180° so that the contact plate 21 will not engage the stop shoulder 23. When the spindle is thus turned, it is held in inoperative position by the spring 13.

In Figs. 13 to 23 I have shown another form of apparatus embodying my invention. In this case I provide a main support 51 which is in the form of a casing enclosing check and closing mechanisms of the same character as those already referred to. The lower part 51ª encloses the check mechanism while the upper part 51ᵇ encloses the closing mechanism, the latter comprising the closing spring 52. The casing 51, which is adapted to be screwed to a door in the usual manner, is provided with a removable cap 51ᶜ which is rigidly secured to the body of the casing. 54 designates the spindle which is operatively connected to the closing and check mechanisms, and 55 is a swinging lever arm rigidly secured at its inner end to the spindle 54 and having its outer end suitably connected by an adjustable link 56 to the frame of the door. 57 is a ratchet wheel having a depending sleeve operatively connected in a suitable manner with the closing spring. The ratchet wheel is free to turn on the spindle 54 but is operatively connected to the swinging arm 55 by means of dog 58.

The foregoing parts constitute in effect a standard door check and closer. To cooperate with said parts I provide the following yielding holding mechanism having essential characteristics peculiar to my invention. As in the case of the first described construction, I provide a yieldingly mounted catch on the swinging arm and a cooperating stop shoulder which is mounted on a carrier that turns on the casing cap 51ᶜ, but in the present construction the catch device is of a different form from that first described and the stop shoulder is designed to be positively locked to the cap 51ᶜ rather than frictionally as in the case of the first construction.

The yielding catch parts comprise a vertical plunger 59 mounted in a sleeve 60 rigid with the arm 55. The lower end of the said sleeve serves as a pivotal support for the ratchet wheel dog 58. The plunger 59 is formed at its upper end with a head 59ª which rests upon the upper end of the sleeve 60 and in turn is pressed by a spring 61 secured by a screw 62 to the arm 55. The plunger 59 is normally held in its lowermost position by the spring 61 but can be raised against the tension of said spring. The effective tension of the spring can be varied by adjusting a screw 63. The plunger 59 is formed at its lower end with opposite beveled faces which are designed to engage the stop shoulder.

Figures 13, 14, 18, 19, 20:
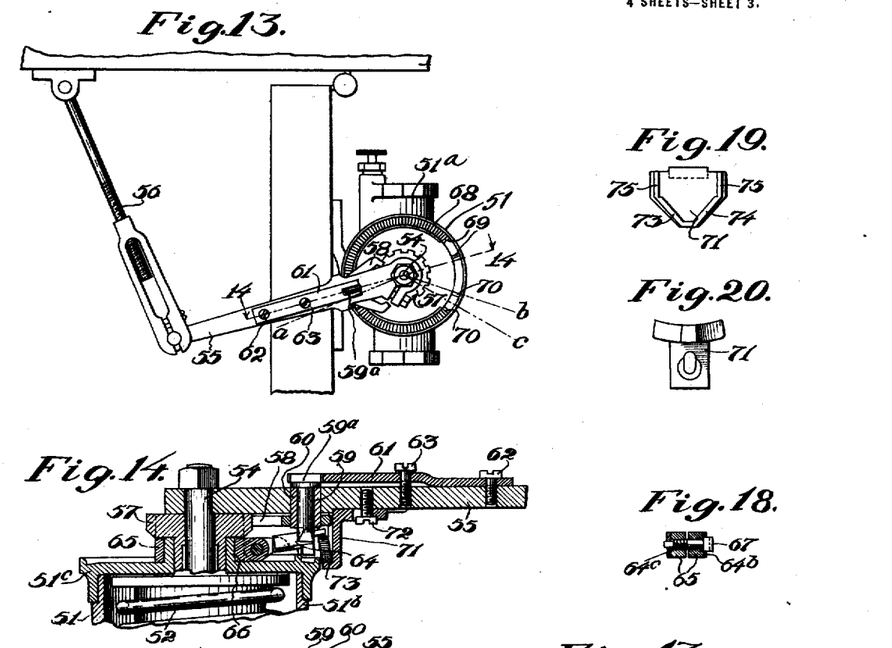
Fig. 13 is a plan view of a modified form of door controlling apparatus operatively connected to a door and its frame, the parts shown in the positions assumed when the door is swung open.
Fig. 14 is a fragmentary vertical section on the line 14—14 of Fig. 13, the stop devices being in the positions occupied at the end of the opening movement of the door.
Fig. 18 is a fragmentary vertical section on the line 18—18 of Fig. 17.
Figs. 19 and 20 are an inside elevation and a bottom view, respectively, of one of the parts of the stop mechanism.
Figure 23:
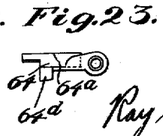

The stop shoulder which cooperates with the catch plunger 59 is in the form of a dog 64 which is pivotally mounted on a rotary carrier in the form of a split band 65 which is rotatably mounted on an upstanding flange 66 of the cap 51ᶜ. The dog 64, which is preferably stamped from sheet steel, is formed with a central longitudinal rib 64ª having inclined sides to cooperate with the beveled lower end of the catch plunger 59. At its inner end the shoulder dog 64 is formed with lugs 64ᵇ, 64ᶜ, which are perforated as indicated in Figs. 18 and 23 to receive a screw 67 which is mounted in the lugs of the split band 65 and serves to draw the ends of the split band together and also as a pivotal support for the shoulder dog 64. Said dog is formed at its outer end with two depending teeth 64ᵈ and with an outwardly extending cam lug 64ᵉ.

The dog teeth 64ᵈ are designed to cooperate with the circumferential series of notches 68 formed on the upper side of the cap 51ᶜ, and also with the additional recesses 69, 69, and 70, 70. When the shoulder dog has its teeth 64ᵈ lowered into engagement with any of the series of notches, the dog is thereby locked against movement around the axis of the spindle 54. To automatically effect the locking and unlocking of the shoulder dog, I provide a depending bracket 71 which is secured to the underside of the swinging arm 55 by a screw 72. On its inner side this bracket is formed with a pair of oppositely inclined cams 73, 74, which are arranged to cooperate with the cam lug 64ᵉ of the shoulder dog 64. The bracket 71 is formed with stop flanges 75, 75 which extend upward from the upper ends of the cams 73, 74.

When the parts of the stop mechanism are assembled the screw 67 is tightened just enough to provide a slight frictional resistance to the turning of the split band 65 on the flange 66.

The operation of this form of my invention will readily be understood from an inspection of Figs. 13 to 17, inclusive. In Fig. 13 the apparatus is shown with the door in open position, having been opened, it will be understood, against the tension of the closing spring 52. At the end of the opening movement the parts of the holding mechanism are in the positions shown in Fig. 14. It will be observed that the cam lug 64ᵉ of the shoulder dog lies at the upper end of the cam 73 against the adjacent stop flange 75 and that the dog 64 is thus held in elevated position out of engagement with the notches 68. If, now, the door is released, the tension of the closing spring 52 will cause the swinging arm 55 to move in a counter-clockwise direction (Fig. 13). When this movement occurs the cam lug 64ᵉ rides down the cam 73 and the teeth 64ᵈ of the shoulder dog are lowered into engagement with the notches 68 of the casing cap. Thus, when the arm 55 has moved to the position indicated by the radial line $a$ in Fig. 13, the parts of the holding mechanism occupy the positions indicated in Figs. 15 and 17. In this position one of the beveled faces of the plunger 59 engages the adjacent inclined surface of the stop shoulder and further closing movement of the door is thus prevented. The plunger 59, however, is held in its lower position by the spring 61 and if a moderate pressure is applied to the door in the closing direction, the resistance of the spring 61 will be overcome and the plunger 59 will ride up over the stop shoulder, thus freeing the door to be closed by the spring 52 under control of the check mechanism in the usual manner. When the door is thus freed for its closing movement, the movement of the arm 55 in relation to the stop shoulder 64 causes the inclined cam 74 to engage the cam lug 64ᵉ and lift the teeth 64ᵈ out of engagement with the notches of the casing cap. When the cam lug 64ᵉ rises to the top of the cam 74, it is engaged by the stop flange 75 and thereupon the stop shoulder, together with the split band 65, move in unison with the swinging arm 55 as the door continues its closing movement.

Figures 15, 16:
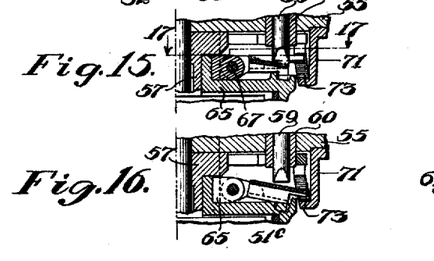
Fig. 15 is a fragmentary vertical section showing the positions occupied by the coacting stop devices when the swinging lever arm has moved, in the closing movement of the door, to the position indicated by the radial line *a* in Fig. 13.
Fig. 16 is a fragmentary vertical section showing the positions occupied by the coacting stop devices during the first part of the opening movement of the door with the swinging lever arm in the position indicated by the radial line *c* in Fig. 13.
Figure 17:
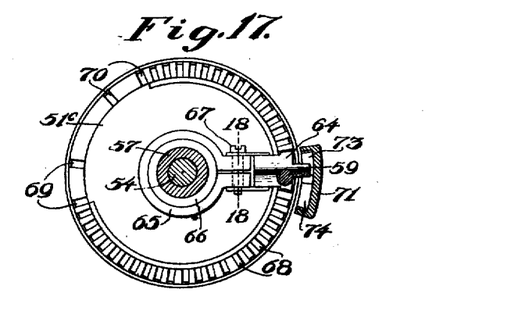
Fig. 17 is a view showing the parts of Fig. 14 in horizontal section taken on the broken line 17—17 of Fig. 15.
Figure 21:
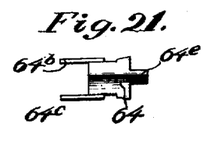
Figs. 21, 22 and 23 are a plan, an outer end elevation and a side elevation, respectively, of another part of the stop mechanism.
Figure 22:
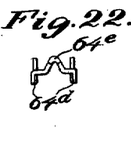

The angular position of the swinging arm 55 in relation to the casing 51 when the door is closed is indicated by the radial line $b$ in Fig. 13. When the arm occupies this position, the shoulder dog 64 is held in raised position with its teeth 64ᵈ directly over the notches 70, 70. Therefore, when the door begins to open, the lug 64ᵉ of the stop shoulder rides down the cam 74 and the teeth 64ᵈ are lowered into the notches 70. These latter notches, and the notches 69 as well, are made deeper than the notches 68 and the shoulder dog is therefore lowered so that the plunger 59 can pass over it without engagement. The positions of the plunger and the shoulder dog when the swinging arm 55 has moved to the position indicated by the radial line $c$ (Fig. 13) in the opening movement, are indicated in Fig. 16. As the opening movement continues from this point, the cam 73 engages the lug 64ᵉ and the shoulder dog 64 is raised to the position shown in Fig. 14 and thereupon carried forward with the swinging arm 55 so that at the end of the opening movement the parts are in the positions indicated in Fig. 14.

It will be seen that in the opening movement of the door the holding device offers no resistance to the opening movement except for the slight frictional action of the split band 65.

If it is desired to throw the holding mechanism out of action so that the apparatus will operate simply as a door check and closing mechanism, it is only necessary to loosen the screw 72 and move the cam bracket 71 radially outward far enough to free the shoulder dog 64 whereupon the latter can be swung to a position out of the range of movement of the arm 55.

As shown on the drawing, the apparatus last described is applied to a door opening to the right, but it is equally applicable to a door opening to the left, it being only necessary, when applying the apparatus to a left hand door, to see that the shoulder dog 64 is brought directly over the notches 69, 69 when the door is in its closed position.

In Figs. 25 to 35, inclusive, I have shown a door holding apparatus designed for use independently of the door check and closing mechanism and adapted to yieldingly hold a door against movement in either direction from any open position. In this apparatus 81 is the main support which is in the form of a bracket adapted to be screwed to a door, the projecting part of the support being a circular plate having a central upstanding stud 82. Upon this stud is rotatably mounted a swinging arm 83, the outer end of which is connected by means of an adjustable link 84 to the frame of the door.

Upon the support 81 and swinging arm 83 are mounted a stop mechanism which is in most respects similar to that shown in Figs. 13 and 23. 85 is a catch plunger slidably mounted in the arm 83 and normally held in its lowermost position by a spring 86 secured to the arm 83 by a screw 87, an adjustable screw 88 being provided to vary the effective pressure of the spring 86 against the plunger. The lower end of the plunger 85 has oppositely arranged beveled faces designed to cooperate with a stop shoulder mounted on the support 81.

Figures 28, 32:
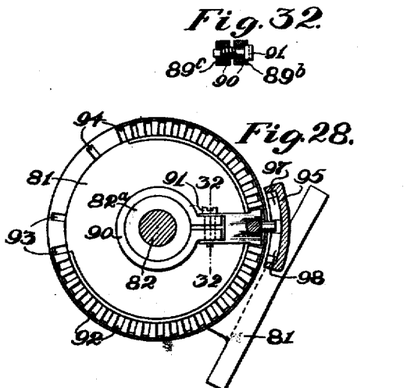
Fig. 28 is a view of the apparatus in horizontal section on the line 28—28 of Fig. 26.
Fig. 32 is a fragmentary vertical section on the line 32—32 of Fig. 28.
Figure 31:
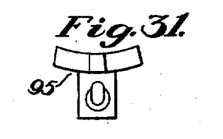
Figure 33:
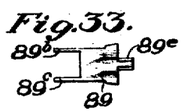
Figs. 33, 34 and 35 are a plan view, an outer end elevation and a side elevation, respectively, of one of the parts of the stop mechanism.
Figures 34, 35:
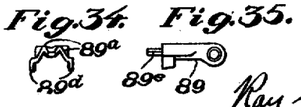

The stop shoulder referred to is in the form of a dog 89 which is pivotally mounted on a rotary carrier in the form of a split band 90 which is rotatably mounted on the lower, enlarged part 82ᵃ of the stud 82. The dog 89, which is preferably stamped from sheet steel, is formed at its outer end with two parallel longitudinally extending ribs 89ᵃ which have inclined sides to cooperate with the beveled lower end of the catch plunger 85. At its inner end the shoulder dog 89 is formed with lugs 89ᵇ, 89ᶜ, which are perforated, as indicated in Figs. 32 and 35, to receive a screw 91 which is mounted in the lugs of the split band 90 and serves to draw the ends of the band together and also as a pivotal support for the shoulder dog 89. Said dog is formed at its outer end with two depending teeth 89ᵈ and with an outwardly extending cam lug 89ᵉ.

The dog teeth 89ᵈ are designed to cooperate with a circumferential series of notches 92 formed on the upper side of the main support 81, and also with the additional notches or recesses 93, 93 and 94, 94. When the shoulder has its teeth 89 lowered into engagement with any of the series of notches, the dog is thereby locked against movement around the axis of the stud 82. To automatically effect the locking and the unlocking of the shoulder dog, I provide a depending bracket 95 which is secured to the under side of the swinging arm 83 by a screw 96. On its inner side this bracket is formed with a pair of oppositely inclined cams 97, 98, which are arranged to cooperate with the cam lug 89ᵉ of the shoulder dog 89. The bracket 95 is formed with stop flanges 99, 100, which extend upward from the upper ends of the cams 97, 98, respectively.

When the parts of the stop mechanism are assembled the screw 91 is tightened just enough to provide a slight frictional resistance to the turning of the band 65 on the stud.

Figures 24, 29, 30:
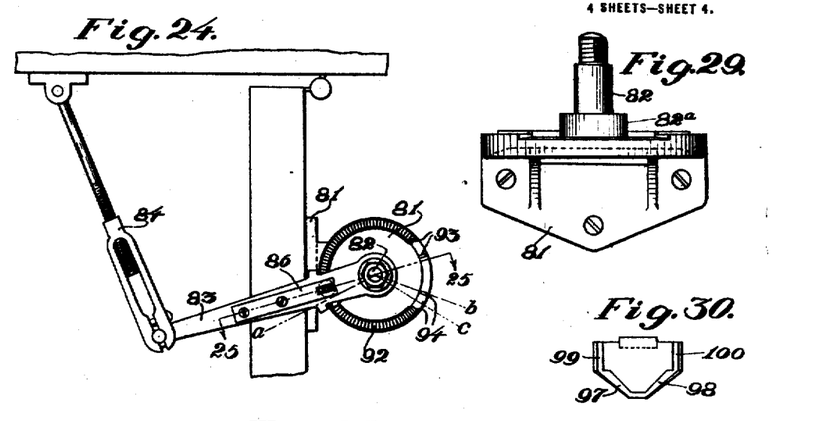
Fig. 24 is a plan view of a door stop mechanism designed to operate independently of a closing mechanism, the device being shown operatively connected to a door and its frame.
Fig. 29 is a front elevation of the main supporting member of the apparatus shown in Fig. 24.
Figs. 30 and 31 are an inside elevation and a bottom view, respectively, of one of the parts of the stop mechanism.
Figure 25:
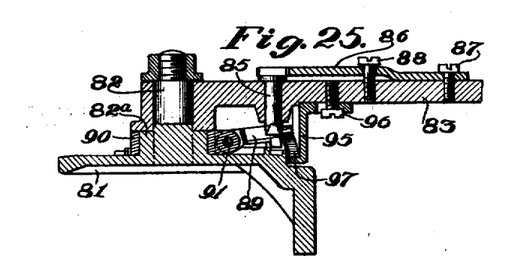
Fig. 25 is a vertical section on the line 25—25 of Fig. 24.

The operation of the last described apparatus is as follows: In Fig. 24 the apparatus is shown with the door in open position. At the end of the opening movement the parts of the stop mechanism are in the positions shown in Fig. 25. It will be observed that the cam lug 89ᵉ of the shoulder dog lies at the upper end of the cam 97 against the adjacent stop flange 99 and that the dog 89 is thus held in elevated position out of engagement with the notches 92. In order to yieldingly lock the door in open position it is only necessary to move the door slightly in the direction to close it, thus causing the swinging arm 83 to move slightly in a counter-clockwise direction (Fig. 24). When this movement occurs the cam lug 89ᵉ rides down the cam 97 and the teeth 89ᵈ of the shoulder dog are lowered into engagement with the notches 92 of the casing cap. Then a slight continuation of the swinging movement of the arm 83 brings the lower beveled end of the catch plunger 85 against the outer inclined side of the first of the two shoulder ribs 89ᵃ. If the door is then released, it would be yieldingly held against closing by the tension of the catch spring 86; but by applying a moderate closing pressure to the door the resistance of the spring 86 can be overcome so that the catch plunger 85 is permitted to ride upward over the first shoulder rib and into the space between the pair of shoulder ribs. Fig. 26 shows the parts of the catch mechanism in the positions last referred to and it will be seen that the door is yieldingly held against movement in either direction, but can be moved in either direction by applying sufficient pressure to overcome the tension of the spring 86. Thus, when the catch is released by pressure to close the door, the plunger 85 is caused to rise over one of the shoulder ribs 89ᵃ, and the movement of the arm 83 in relation to the shoulder dog 89 causes the inclined cam 98 to engage the cam lug 89ᵉ and lift the teeth 89ᵈ out of engagement with the notches 92. When the cam lug 89ᵉ rises to the top of the cam 98, it is engaged by the stop flange 100 and thereupon the shoulder dog, together with the split band 90, move in unison with the swinging arm 83 as the door continues its closing movement.

Figure 27:
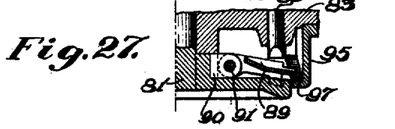
Fig. 27 is a fragmentary vertical section showing the position of the co-acting stop devices during the first part of the opening movement of the door when the swinging lever arm is in the position indicated by the radial line $c$ in Fig. 24.

The angular position of the swinging arm 83 in relation to the main support 81 when the door is closed is indicated by the radial line b in Fig. 24. When the arm occupies this position, the shoulder dog 89 is held in raised position with its teeth 89ᵈ directly over the notches 94, 94. Therefore, when the door begins to open, the lug 89ᵉ of the stop shoulder rides down the cam 98 and the teeth 89ᵈ are lowered into the notches 94. These latter notches, and the notches 93 as well, are made deeper than the notches 92 and the shoulder dog is therefore lowered so that the plunger 85 can pass over it without engagement. The positions of the plunger and the shoulder dog when the swinging arm 83 has moved to the position indicated by the radial line c (Fig. 24) in the opening movement, are indicated in Fig. 27. As the opening movement continues from this point, the cam 97 engages the lug 89ᵉ and the shoulder dog 89 is raised to the position shown in Fig. 25 and thereupon carried forward with the swinging arm 83 so that at the end of the opening movement the parts are in the positions indicated in Fig. 25.

It will be seen that in the opening movement of the door the stop device offers no resistance to the opening movement except for the slight frictional action of the band 90.

If one desires to throw the stop mechanism out of action, it is only necessary to loosen the screw 96 and move the cam bracket 95 radially outward far enough to free the shoulder dog 64 whereupon the latter can be swung to a position out of the range of movement of the arm 83. The last described apparatus, like that shown in Figs. 13 to 23, can be applied to either a right or left hand door. In the drawings the apparatus is shown applied to a door opening to the right. In applying it to a left hand door it is only necessary to see that the shoulder dog 89 is brought directly over the notches 93, 93, when the door is in its closed position.

In the construction shown in Figs. 1 to 12, the grooved flange 26 and the friction shoes 28 constitute clutch parts that are automatically pressed together to frictionally hold the door in open position and that are released by the slight manual movement of the door to permit the closer mechanism to move the door to its fully closed position. In Figs. 13 to 23 there are corresponding clutch parts 68 and 64 and in the construction illustrated in Figs. 24 to 35 there are corresponding clutch parts 92 and 89. In the two latter cases, however, the clutch parts have a positive engagement instead of the frictional engagement of the first form of construction.

I have referred to my improvements as especially useful in connection with interior doors, but it is to be understood that any of the forms of apparatus described may be used on outside doors where the conditions make a door controlling apparatus of such character desirable.

For purposes of illustration and explanation I have shown several preferred forms of construction, but it is to be understood that I do not limit my invention to these particular forms except as indicated in the appended claims. And it will, of course, be understood that in the forms of construction shown there can be variation in the relative forms and dimensions of the parts within the skill of the designer.

What I claim is:—

1. A door controlling mechanism adapted to be operatively connected to a door and its frame and having in combination means for closing the door and holding means for automatically opposing the force of the closing means to hold the door open when it is opened to any position, the said holding means comprising coacting clutch parts releasable by a slight manual movement of the door from its open position to permit the closing means to move the door to its fully closed position.

2. In a door controlling apparatus, the combination of a supporting member adapted to be fixed to the door, a member movably mounted in relation to the fixed member and adapted to be connected to the door frame, means for moving the movable member in relation to the fixed member in a direction to close the door, and holding means interposed between the fixed and movable members and acting automatically to oppose the force of the closing means and hold the door open when it is opened to any position, the said holding means comprising coacting clutch parts releasable by a slight manual movement of the door to permit the closing means to move the door to its fully closed position.

3. In a door controlling apparatus, the combination of a casing adapted to be fixed to the door, door closing devices enclosed in the casing, a swinging lever arm carried by the casing and operatively connected with the closing devices, said arm being adapted to be connected to the door frame, and holding devices carried by the casing and lever arm and operating automatically to oppose the force of the closing devices and hold the door open when it is opened to any position, the said holding means comprising coacting clutch parts releasable by a slight manual movement of the door to permit the closing devices to move the door to its fully closed position.

4. In a door controlling apparatus, the combination of a main supporting member adapted to be fixed to the door, a swinging lever arm carried by the supporting member and adapted to be connected at its outer end to the frame of the door, a double acting closer spring adapted to move the swinging arm in either direction to close either a right hand or left hand door, and cooperating holding devices mounted on the supporting member and the swinging arm and automatically operable, with either a right hand or left hand door at the beginning of the closing movement of the arm after the door has been opened to any position, to hold said arm against the closing action of the spring, the said holding devices comprising coacting clutch parts releasable by a slight manual movement of the door to permit the closer spring to move the door to its fully closed position.

5. In a door controlling apparatus, the combination of a main supporting member adapted to be fixed to the door, a swinging lever arm carried by the supporting member and adapted to be connected at its outer end to the frame of the door, holding devices operatively connected to the supporting member and the swinging arm and acting automatically when the door has been opened to any position to hold it against closing, said holding devices comprising coacting clutch parts releasable by a slight manual movement of the door to permit free movement of the door to its fully closed position.

6. In a door controlling apparatus, the combination of a relatively fixed supporting member, a second member movably mounted relative to the fixed member and cooperating holding devices mounted on said fixed and movable members, respectively, one of said devices being movable relative to its supporting member and having a lost motion connection with the other member and one of said devices being yieldingly mounted, and means for temporarily locking the said movably mounted device to its supporting member while the lost motion occurs between said device and the other member.

7. In a door controlling apparatus, the combination of a supporting member adapted to be fixed to a door, a swinging lever arm carried by the supporting member and adapted to be connected at its outer end to a door frame, cooperating holding devices comprising a stop shoulder mounted on the supporting member to move in an arcuate path and a catch mounted on the swinging arm to cooperate with the shoulder, means forming a lost motion connection between the stop shoulder and the swinging arm, and means operating when the arm begins its door closing movement and within the limits of the aforesaid lost motion to lock the shoulder to the supporting member in advance of the catch, one of the holding devices being yieldingly mounted whereby the door is yieldingly held against closing when the stop shoulder is locked as aforesaid.

8. In a door controlling apparatus, the combination of a supporting member adapted to be fixed to a door, a swinging lever arm carried by the supporting member and adapted to be connected at its outer end to a door frame, cooperating holding devices comprising a stop shoulder mounted on the supporting member to move in an arcuate path and a catch mounted on the swinging arm to cooperate with the shoulder, means forming a lost motion connection between the stop shoulder and the swinging arm, and means controlled by the aforesaid lost motion when the door starts to close for first locking the shoulder to the supporting member in advance of the catch and then releasing it, one of the holding devices being yieldingly mounted whereby the door is yieldingly held against closing when the stop shoulder is locked as aforesaid.

9. In a door controlling apparatus, the combination of a relatively fixed supporting member, a second member movably mounted relative to the fixed member and cooperating holding devices mounted on said fixed and movable members, respectively, one of said devices being movable relative to its supporting member and having a lost motion connection with the other member and one of said devices being yieldingly mounted, and means for temporarily frictionally locking the said movably mounted device to its supporting member while the lost motion occurs between said device and the other member.

10. In a door controlling apparatus, the combination of a supporting member adapted to be fixed to the door, a swinging lever arm carried by the supporting member and adapted to have its outer end operatively connected to the door frame, means comprising a spring for swinging the lever arm in relation to the supporting member to close the door, cooperating holding devices comprising a stop shoulder mounted on the supporting member to move in an arcuate path and a catch mounted on the swinging arm in position to engage the shoulder, means forming a lost motion connection between the shoulder and the swinging arm, and friction devices actuated by the force of the closing spring and operating when the swinging arm begins its door closing movement and within the limits of the aforesaid lost motion to lock the shoulder to the support in advance of the catch, one of the said holding devices being yieldingly mounted whereby the door is yieldingly held against closing when the stop shoulder is locked as aforesaid.

11. A door controlling mechanism adapted to be operatively connected to a door and its frame and having in combination means for closing the door, and means operating automatically to render said closing means ineffective and hold the door open when it is opened to any position, the said automatically operating means comprising parts operable by a slight manual movement of the door from its open position to restore the effectiveness of the closing means and permit the latter to move the door to its fully closed position.

12. In a door controlling apparatus, the combination of a main supporting member adapted to be fixed to either a right hand or a left hand door, a swinging lever arm carried by the supporting member and adapted to be connected at its outer end to the frame of the door, and holding devices operatively connected to the supporting member and the swinging arm and automatically operable with either a right hand or left hand door to resist the first part only of the closing movement of said door after it has been opened to any position, said holding devices comprising coacting clutch parts releasable by a slight manual movement of the door to permit free movement of the door to its fully closed position.

In testimony whereof I affix my signature, in the presence of two witnesses.

RAY STEWART GEHR.

Witnesses:
ERNEST A. PERHAM,
A. G. RUSSELL.

Certificate of Correction.

It is hereby certified that in Letters Patent No. 1,408,186, granted February 28, 1922, upon the application of Ray Stewart Gehr, of Cleveland, Ohio, for an improvement in "Door-Controlling Apparatus," an error appears in the printed specification requiring correction as follows: Page 1, lines 18 and 19, for the words "when the door is released in any open position" read *when the door is opened to any position;* and that the said Letters Patent should be read with this correction therein that the same may conform to the record of the case in the Patent Office.

Signed and sealed this 24th day of April, A. D., 1922.

[SEAL.] KARL FENNING,
*Acting Commissioner of Patents.*